United States Patent [19]

Holtz et al.

[11] 4,144,408
[45] Mar. 13, 1979

[54] TELEPHONE RINGING EXTENDER

[75] Inventors: Roger E. Holtz, Indianapolis, Ind.;
Bernard A. Tilson, Parsippany;
Gordon D. Woods, Denville, both of N.J.

[73] Assignee: Bell Telephone Laboratories, Incorporated, Murray Hill, N.J.

[21] Appl. No.: 873,476

[22] Filed: Jan. 30, 1978

[51] Int. Cl.² .............................................. H04Q 1/44
[52] U.S. Cl. ................................................ 179/16 E
[58] Field of Search .................. 179/84 R, 84 A, 16 E

[56] References Cited

U.S. PATENT DOCUMENTS 1,719,499   1/1929   Bowne ........................ 179/16 E

*Primary Examiner*—William C. Cooper
*Attorney, Agent, or Firm*—Robert O. Nimtz

[57] ABSTRACT

A telephone ringing extender is shown which includes a ringing signal detector and a switch. In response to ringing signals, the ringing extender grounds the tip conductor to operate telephone ringers bridged on the loop. Protection against excessive voltages and excessive currents is also provided.

8 Claims, 1 Drawing Figure

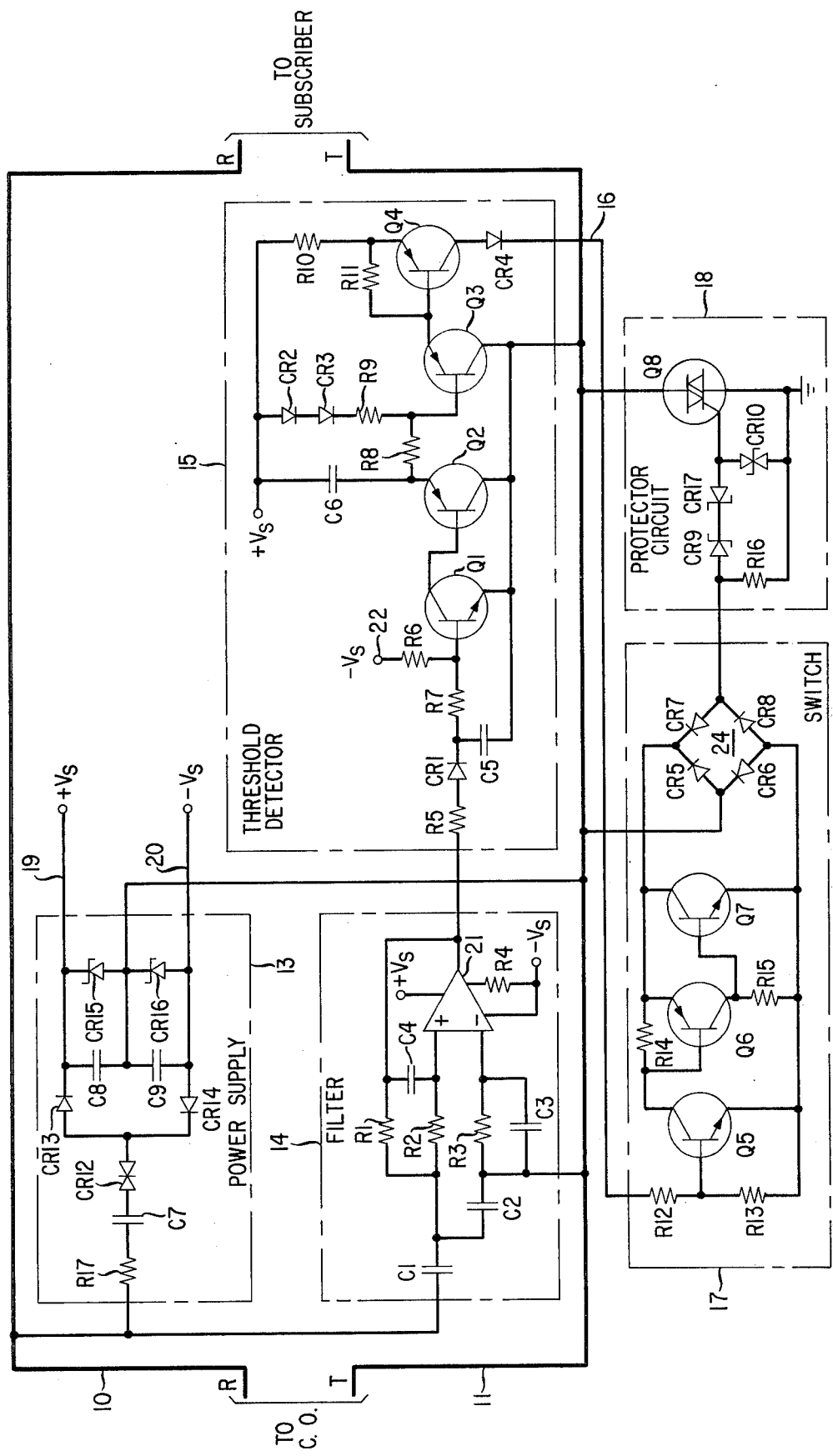

TELEPHONE RINGING EXTENDER

BACKGROUND OF THE INVENTION

1. Field of the Invention

This invention relates to telephone ringing extenders and, more particularly, to ringing and protector interfaces between telephone loops and internal telephone subscriber wiring.

2. Description of the Prior Art

Registration requirements of the Federal Communications Commission require a two-wire interface between customer-provided equipment and the telephone network. On many telephone subscriber loops, particularly long loops, it has been common to connect the ringer in the subscriber telephone set between one side of the loop and ground potential. This arrangement increases the amount of current that can be delivered over the long loop to ring subscriber telephone sets which may include as many as five extension telephones. Such loops are found in rural and suburban areas and in central office installations utilizing fine gauge wire for intermediate length loops.

The ability of telephone subscribers to purchase their own telephone sets from any supplier further requires that telephone sets be of standard design and prewired in a standard configuration. As noted above, the two-wire interface implies that the telephone ringers are bridged between the tip and ring conductors, and that grounded ringers will not be used. Since it is expected that the wider and more dispersed availability of telephone sets will increase the average number of extension telephones at a subscriber location, it appears likely that this problem will be aggravated in the future. A current requirement is the ability to operate five ringers on a 2800 ohm subscriber loop.

One solution to the multiple ringer problem on long loops is disclosed in C. E. Jones, Jr. et al. U.S. Pat. No. 4,021,617, granted May 5, 1977. In the Jones, Jr. et al. arrangement, ringing signals are detected at the end of long subscriber loops by electronic detection circuitry. In response to such ringing signals, the ringer, connected to one of the loop conductors, is grounded to provide a low impedance connection for ringing return current. The Jones, Jr. et al arrangement, however, requires a three- or four-wire interface to the telephone set to provide the ground connection.

SUMMARY OF THE INVENTION

In accordance with the illustrative embodiment of the present invention, an electronic ringing signal detector is bridged between the tip and ring conductors of the subscriber loop. In response to ringing signals on the loop, this detector operates a low impedance switch connecting the tip conductor to ground potential. This low impedance switch provides a high current path for the ringers at the subscriber location and yet requires only a two-wire interface to the telephone set.

In further accordance with the illustrative embodiment of the present invention, an overvoltage and overcurrent protector circuit is included to ground out excessive voltages and excessive currents on the loop.

One advantage of the present invention is the fact that the interface unit can be mounted outside the customer premises at or near the lightning protector block where a ground connection is readily available. This placement permits maintenance of the interface unit without gaining access to the customer's premises.

Other advantages of the present invention include a ringing signal detector which rejects dial pulses and 60 Hz induced voltages. The ringing extender of the present invention does not distort dial pulses, operates in the presence of high longitudinal voltages and can withstand large power and lightning surges. The unit can be tested from the central office in the absence of ringers on the line by applying ringing signals and measuring the current to ground.

BRIEF DESCRIPTION OF THE DRAWING

The single figure in the drawing is a detailed circuit diagram of the two-wire telephone loop interface circuit in accordance with the present invention.

DETAILED DESCRIPTION

In the drawing, a subscriber telephone loop shown as ring conductor 10 and tip conductor 11 is connected from the central office to the left of the drawing to the telephone subscriber telephone sets to the right of the drawing. Bridged between conductors 10 and 11 are a power supply 13, a filter circuit 14 and a threshold detector circuit 15. Power supply 13 provides a balanced voltage source of preselected magnitude for powering the electronic circuits of the interface units. Filter circuit 14 is an active filter designed to be responsive to ringing signals (nominally 20 Hz) while at the same time rejecting dialing signals and power frequency voltages. Filter 14 provides the input to threshold circuit 15.

Threshold circuit 15 compares the output of filter 14 with a reference voltage and, when the filter output exceeds the reference voltage, provides a control signal on output lead 16. Lead 16 is connected to a switching circuit 17 which, when operated by a signal on lead 16, connects tip conductor 11 through a resistor R16 to ground potential.

Protector circuit 18 monitors the voltage on tip lead 11 and monitors the current through resistor R16. When either this voltage or this current exceeds a preselected maximum, protector circuit 18 operates to ground tip conductor 11 directly to protect the electronic components as well as service personnel working on the loop.

It can be seen that the arrangement in the drawing provides a two-wire interface to the subscriber telephone sets and, at the same time, permits a large number of ringers to be operated on long subscriber loops. Power supply 13 includes a surge-limiting resistor R17, a direct current blocking capacitor C7 and a varistor CR12 which has a high impedance at talking voltages to minimize the insertion loss during talking. Diodes CR13 and CR14 provide full wave rectification of the voltage across conductors 11 and 12. Capacitors C8 and C9 filter out the alternating current components of the line voltage, while zener diodes CR15 and CR16 limit the voltages on leads 19 and 20 to preselected values (e.g., 6.8 volts). Capacitor C7 limits the current drawn by the power supply 13, while resistor R17 limits current during lightning surges.

Filter circuit 14 is an active filter comprising a DC blocking capacitor C1 and a frequency determining circuit including resistors R1 and R2 and capacitors C2 and C4. This network is connected to an operational amplifier 21 in an active filter configuration having a midband frequency center at 20.5 Hz. A resistor R3 connected to the other input of operational amplifier 21, balances the input bias current of the amplifier, while capacitor C3 provides an alternating current ground for this input. A resistor R4 sets the supply current drawn by operational amplifier 21. Operational amplifier 21 is energized from the balanced power supply 13 to reduce the turn-on transients when amplifier 21 is energized. With balanced supplies, none of the timing capacitors of filter 14 acquire a direct current charge when the filter is connected to the circuit. Long duration start-up transients are thereby eliminated. At the same time, the voltage supply is selected to have a magnitude sufficiently low to cause amplifier 21 to clip during dialing transients but not to clip the alternating current ringing signal. This nonlinear operation maximizes the dynamic range of the filter and improves its signal discrimination. A suitable circuit for operational amplifier 21 is the Fairchild µA 776HM or the Motorola MC 1776G integrated circuit.

The output of filter 14 is fed into threshold detector 15 which includes an input resistor R5 to slow down the dialing transients in the output of filter 14. Diode CR1 half-wave rectifies the output of filter 14 and builds up a charge on capacitor C5. The voltage on capacitor C5 is compared with the negative supply voltage at terminal 22 by a voltage divider including resistors R7 and R6. When the voltage on capacitor C5 reaches a predetermined positive threshold, transistor Q1 is turned on, operating direct current amplifying stages including transistors Q2, Q3 and Q4. The emitter circuit of transistor Q2 includes a capacitor C6 which bridges the ringing cycle interruptions and keeps transistor Q2 ON throughout the ringing cycle. Coupling resistor R8, between the emitter of transistor Q2 and the base of transistor Q3, together with biasing resistor R9 and diodes CR2 and CR3, regulates the current drawn through transistor Q4. Transistor Q4 is biased by resistors R10 and R11 to form a constant current source for the control current flowing through coupling diode CR4. Transistor Q4 and diode CR4 block high voltages to ground.

The control current delivered from threshold circuit 15 on lead 16 is supplied to switch circuit 17. Switch circuit 17 includes a voltage divider comprising resistors R12 and R13. The base of transistor Q5 is connected to the midpoint between resistors R12 and R13 to turn transistor Q5 on in the presence of this control current on lead 16. Transistor Q5, in turn, drives transistor Q7. Transistors Q5, Q6 and Q7 form from a high gain, high current switch which is used to connect the tip conductor 11 to ground potential and to provide positive turn-off, even if the subscriber is off-hook. Resistors R13, R14 and R15 reduce the leakage through this switch when it is in the OFF condition. A diode bridge 24 provides a return path for switching current regardless of the polarity of the voltage between ring conductor 10 and tip conductor 11.

The protector circuit 18, as previously noted, includes a resistor R16 through which the current flows when switch 17 is operated. The resulting voltage drop across resistor R16 is sensed by the zener diodes CR9 and CR17. If this voltage exceeds the zener breakdown voltage of either of diodes CR9 or CR17, a triac Q8 is triggered to connect tip conductor 11 directly to ground potential. Triac Q8 shunts the excessive ringing current away from switch 17 and thereby protects the electronic components of switch 17 from current surges.

If the voltage on tip conductor 11 becomes excessive, this voltage is sensed by varistor CR10 which also triggers triac Q8 to ground tip conductor 11. Circuit 18 therefore provides both overcurrent and overvoltage protection for the remainder of the components of the circuit.

It will be noted that conductors 10 and 11 can be energized with ringing signals superimposed on a central office battery voltage of either polarity. If the tip conductor 11 is positive with respect to ground in the superimposed ringing condition, diodes CR6 and CR7 of diode bridge 24 provide a return path for this direct current voltage to ground. If the tip conductor 11 is negative with respect to ground, diodes CR5 and CR8 of diode bridge 24 provide a return path to tip conductor 11.

Since the threshold circuit 15 provides a very small operating current (150 µA) on lead 16 to minimize ringing voltage loss, switch 17 must provide a very high gain to carry large ringing and 60 Hz induction currents (exceeding 150 milliamps). The three-transistor Darlington configuration of Q5, Q6 and Q7 satisfies this requirement.

Typical component values for the components in the drawing are shown in the following table:

R1 = 4.64M ohms
R2 = 4.64M ohms
R3 = 9.1M ohms
R4 = 6.8M ohms
R5 = 26.1K ohms
R6 = 348K ohms
R7 = 86.6K ohms
R8 = 90.9K ohms
R9 = 68.1K ohms
R10 = 10K ohms
R11 = 100K ohms
R12 = 18.7K ohms
R13 = 328K ohms
R14 = 200K ohms
R15 = 200K ohms
R16 = 46.4 ohms
R17 = 2.74K ohms
C1 = 110 pf
C2 = 0.01 µf
C3 = 4700 pf
C4 = 277 pf
C5 = 2.2 µf
C6 = 0.047 µf
C7 = 0.326 µf
C8 = 10 µf
C9 = 10 µf It is to be understood that the above described arrangements are merely illustrative of the application of the principles of the invention. Numerous other arrangements may be readily devised by those skilled in the art without departing from the spirit and scope of this invention.

What is claimed is:

1. A telephone ringing extender including a ringing signal detector responsive to ringing signals generated at a telephone central office and appearing between one side of the remote end of a telephone loop and ground potential, and a switch responsive to said detector characterized in that
    said switch, when operated by said detector, connects one side of said loop to ground potential to operate telephone ringers bridged on said loop from said ringing signals.

2. The telephone ringing extender according to claim 1 characterized in that
    said detector comprises an active filter including capacitive frequency-determining elements.

3. The telephone ringing extender according to claim 1 characterized by
 a converter for supplying balanced supply voltages to operate said detector and said switch.

4. The telephone ringing extender according to claim 1 characterized in that
 said detector comprises a threshold detector responsive to ringing signals above a preselected threshold to provide a switch operating voltage.

5. The telephone ringing extender according to claim 1 characterized in that
 said switch comprises three transistors connected in a Darlington configuration cascade with successive ones of said transistors being of opposite conductivity types.

6. The telephone ringing extender according to claim 1 characterized by
 a voltage and current responsive overload protection circuit connecting said one side of said loop to ground potential.

7. A telephone interface unit for connecting telephone subscriber premises wiring to the telephone network, said interface unit comprising:
 a filter circuit for ringing signals,
 a threshold detector responsive to a preselected output from said filter circuit for providing a control signal,
 a switching circuit responsive to said control signal for connecting one side of said network to ground potential,
 an overload protector circuit, and
 a balanced current converter for powering said interface unit.

8. The telephone interface unit according to claim 7 wherein said filter circuit comprises an active filter.

* * * * *